(12) United States Patent
Kaal

(10) Patent No.: US 8,175,091 B2
(45) Date of Patent: *May 8, 2012

(54) COMMUNICATION SYSTEM

(75) Inventor: Madis Kaal, Dublin (IE)

(73) Assignee: Skype Limited, Dublin (IE)

( * ) Notice: Subject to any disclaimer, the term of this patent is extended or adjusted under 35 U.S.C. 154(b) by 238 days.

This patent is subject to a terminal disclaimer.

(21) Appl. No.: 11/986,835

(22) Filed: Nov. 27, 2007

(65) Prior Publication Data

US 2008/0165790 A1 Jul. 10, 2008

(30) Foreign Application Priority Data

Nov. 27, 2006 (GB) .................................. 0623621.0
Nov. 23, 2007 (GB) .................................. 0723119.4

(51) Int. Cl.
*H04L 12/28* (2006.01)
*H04L 12/56* (2006.01)

(52) U.S. Cl. .................. 370/389; 370/392; 370/401

(58) Field of Classification Search .................. None
See application file for complete search history.

(56) References Cited

U.S. PATENT DOCUMENTS

| | | | |
|---|---|---|---|
| 6,061,363 A | 5/2000 | Evans et al. | |
| 6,718,028 B2 | 4/2004 | Culli et al. | |
| 6,765,921 B1 | 7/2004 | Stacey et al. | |
| 7,298,714 B2 * | 11/2007 | Foster | 370/315 |
| 7,403,517 B2 | 7/2008 | Westman | |
| 7,454,201 B2 | 11/2008 | Brooking et al. | |
| 7,565,436 B2 | 7/2009 | Rabie et al. | |
| 7,675,881 B2 | 3/2010 | Verma et al. | |
| 7,735,126 B2 | 6/2010 | Zhang et al. | |
| 7,756,548 B2 | 7/2010 | Laroia et al. | |
| 8,014,511 B2 | 9/2011 | Kaal et al. | |
| 2002/0032631 A1 | 3/2002 | Rose | |
| 2002/0071424 A1 | 6/2002 | Chiu et al. | |
| 2002/0103998 A1 | 8/2002 | DeBruine | |
| 2002/0116464 A1 | 8/2002 | Mak | |

(Continued)

FOREIGN PATENT DOCUMENTS

EP 0 695 059 A1 1/1996

(Continued)

OTHER PUBLICATIONS

Notification Concerning Transmittal of International Preliminary Report on Patentability (Chapter I of the Patent Cooperation Treaty), from International Application No. PCT/IB2007/004279, dated Jun. 3, 2009.

(Continued)

*Primary Examiner* — Chirag Shah
*Assistant Examiner* — Srinivasa Reddivalam
(74) *Attorney, Agent, or Firm* — Hamilton, Brook, Smith & Reynolds, P.C.

(57) ABSTRACT

A method of transmitting messages from a network node in a communication network to a first user device can be provided. The network node transmits to a second user device a message-waiting notification. The first user device is identified, and a node holding the message is identified. In response to that notification, the second user device transmits a connection request to the first user device. The connection request is acted on by the first user device to establish a connection. With the identified node, the message can be optionally transmitted to the first user device.

16 Claims, 4 Drawing Sheets

U.S. PATENT DOCUMENTS

| | | |
|---|---|---|
| 2002/0137500 A1 | 9/2002 | Brooking et al. |
| 2002/0143855 A1* | 10/2002 | Traversat et al. ............ 709/202 |
| 2003/0002485 A1 | 1/2003 | Emerson |
| 2003/0105812 A1 | 6/2003 | Flowers et al. |
| 2003/0112823 A1* | 6/2003 | Collins et al. ................ 370/474 |
| 2003/0130008 A1 | 7/2003 | Rajaniemi et al. |
| 2003/0224781 A1 | 12/2003 | Milford et al. |
| 2005/0005030 A1 | 1/2005 | Asai |
| 2005/0074102 A1 | 4/2005 | Altberg et al. |
| 2005/0141509 A1 | 6/2005 | Rabie et al. |
| 2005/0144327 A1 | 6/2005 | Rabie et al. |
| 2005/0176410 A1 | 8/2005 | Brooking et al. |
| 2005/0286519 A1 | 12/2005 | Ravikumar et al. |
| 2006/0072547 A1 | 4/2006 | Florkey et al. |
| 2006/0077971 A1 | 4/2006 | Flowler |
| 2006/0227959 A1 | 10/2006 | Michell |
| 2006/0229101 A1 | 10/2006 | LaBauve et al. |
| 2006/0258289 A1 | 11/2006 | Dua |
| 2007/0019623 A1 | 1/2007 | Alt et al. |
| 2007/0066273 A1 | 3/2007 | Laroia et al. |
| 2007/0238472 A1 | 10/2007 | Wanless |
| 2008/0045186 A1 | 2/2008 | Black et al. |
| 2008/0137829 A1 | 6/2008 | Kaal et al. |
| 2008/0137834 A1 | 6/2008 | Kaal et al. |
| 2008/0139208 A1 | 6/2008 | Kaal |
| 2008/0144578 A1 | 6/2008 | Kaal |
| 2008/0152108 A1 | 6/2008 | Kaal et al. |
| 2008/0165790 A1 | 7/2008 | Kaal |
| 2008/0192734 A1 | 8/2008 | Oruaas et al. |
| 2008/0205308 A1 | 8/2008 | Prehofer et al. |

FOREIGN PATENT DOCUMENTS

| | | |
|---|---|---|
| EP | 1 515 506 A1 | 3/2005 |
| EP | 1 643 740 | 4/2006 |
| EP | 1690165 | 8/2006 |
| GB | 2 398 458 A | 8/2004 |
| GB | 2 405 285 A | 2/2005 |
| WO | WO 99/67922 | 12/1999 |
| WO | WO 00/51331 A1 | 8/2000 |
| WO | WO 01/24478 A2 | 4/2001 |
| WO | WO 01/39469 | 5/2001 |
| WO | WO 01/63861 | 8/2001 |
| WO | WO 01/63861 A1 | 8/2001 |
| WO | WO 02/076049 | 9/2002 |
| WO | WO 02/076049 A1 | 9/2002 |
| WO | WO 02/078268 A1 | 10/2002 |
| WO | WO 03/003678 A1 | 1/2003 |
| WO | WO 2005/009019 A2 | 1/2005 |
| WO | WO 2005/084128 A2 | 9/2005 |
| WO | WO 2006/095787 A1 | 9/2006 |
| WO | WO 2007/044049 A2 | 4/2007 |
| WO | WO 2007/077550 A1 | 7/2007 |

OTHER PUBLICATIONS

Notification Concerning Transmittal of International Preliminary Report on Patentability (Chapter I of the Patent Cooperation Treaty), from International Application No. PCT/IB2007/004260, dated Jun. 3, 2009.

Notification Concerning Transmittal of International Preliminary Report on Patentability (Chapter for the Patent Cooperation Treaty), from International Application No. PCT/IB2007/004259, dated Jun. 11, 2009.

Search Report Under Section 17 for GB 0723123.6, Date of Search: Apr. 18, 2008.

Office Action, U.S. Appl. No. 11/986,974, dated Sep. 29, 2010.

Final Office Action, U.S. Appl. No. 11/986,974, dated Mar. 17, 2011.

Office Action, U.S. Appl. No. 11/986,974 dated Jul. 18, 2011.

* cited by examiner

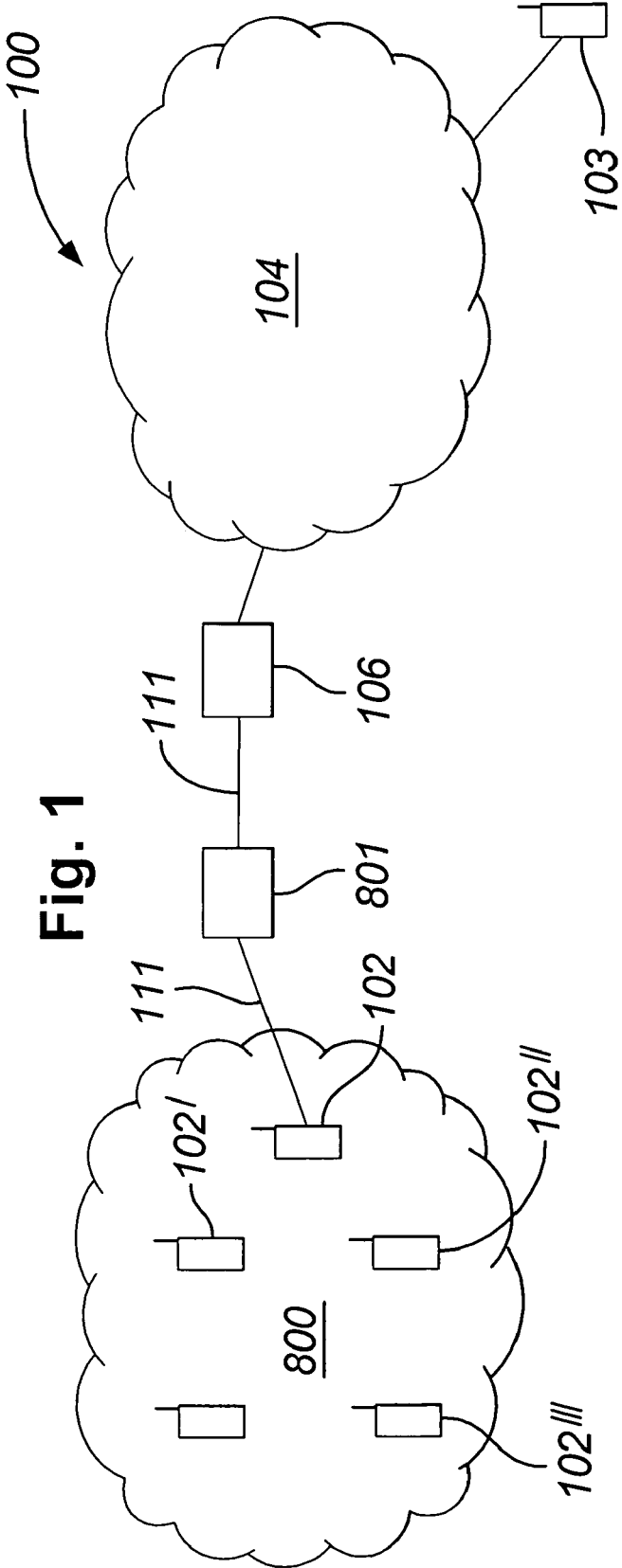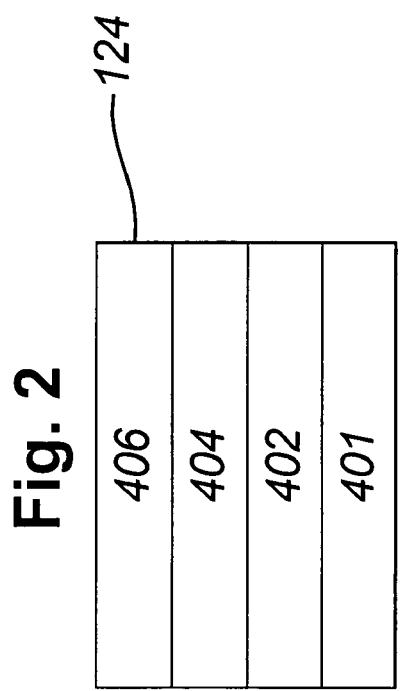

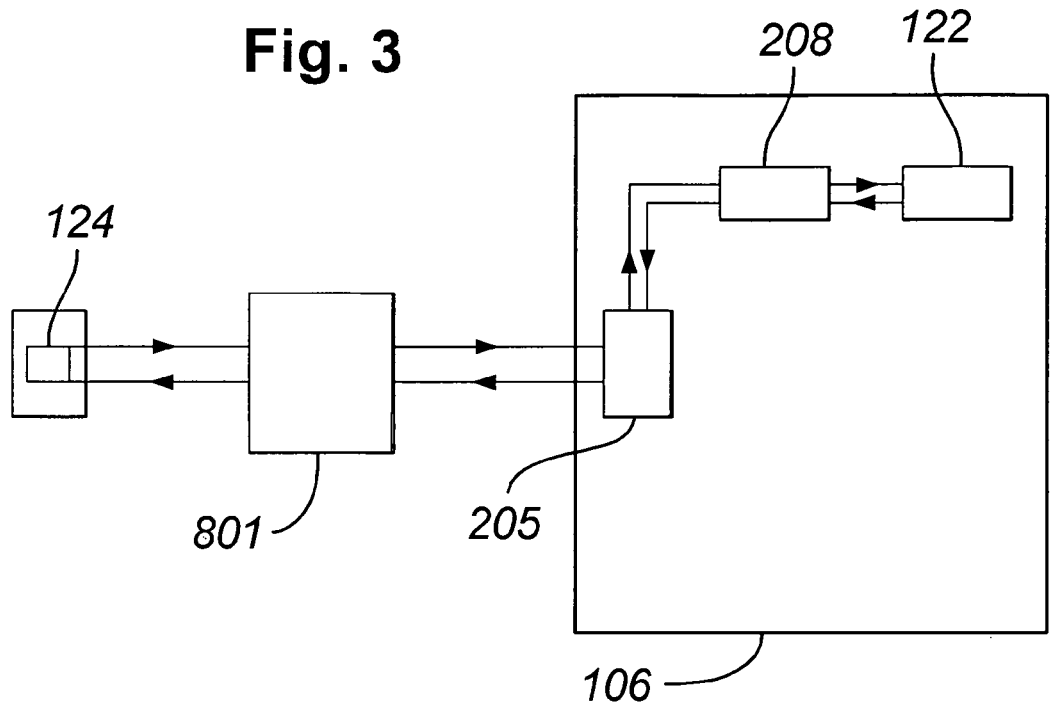
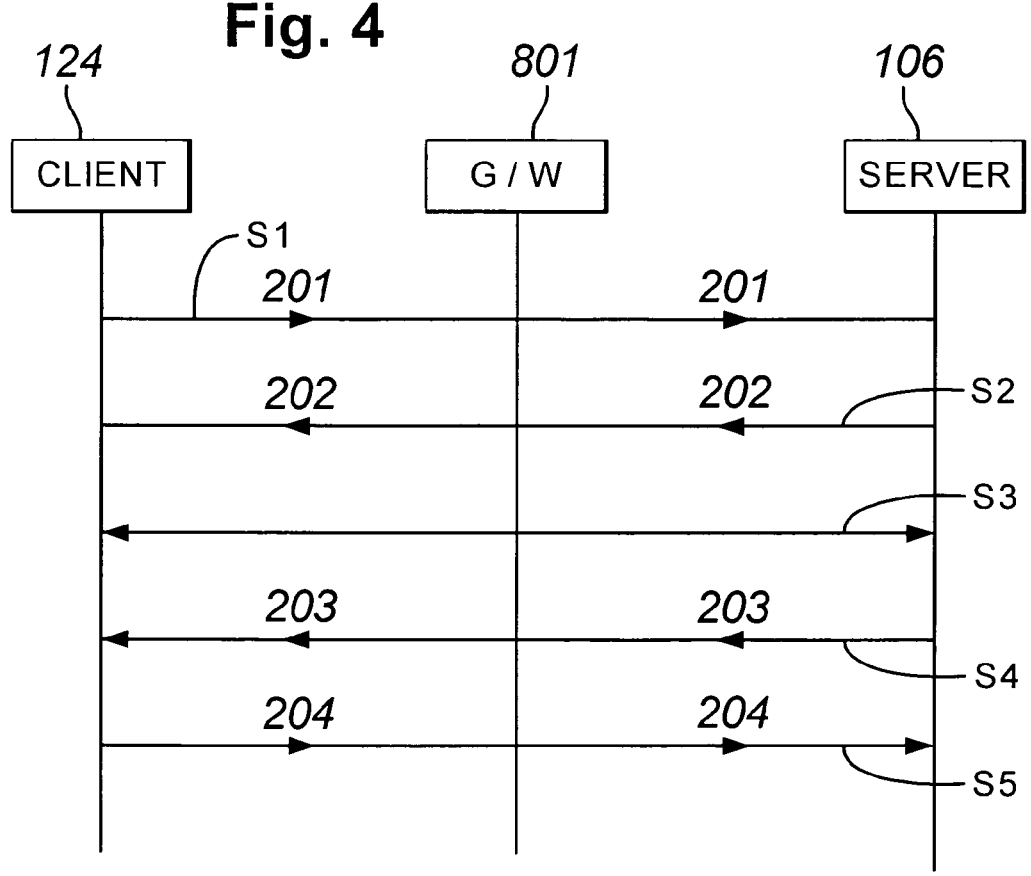

COMMUNICATION SYSTEM

RELATED APPLICATIONS

This application claims priority under 35 U.S.C. §119 or 365 to Great Britain Application No. 0623621.0, filed Nov. 27, 2006 and Great Britain Application 0723119.4 filed Nov. 23, 2007. The entire teachings of the above applications are incorporated herein by reference.

TECHNICAL FIELD

The present invention relates to a method for handling communication in a communication system.

BACKGROUND

Communication systems link together two communication devices so that the devices can send information to each other in a call or other communication event. Information may include voice, text, images or video.

One such communication system is a peer to peer communication system, in which a plurality of end users can be connected for communication purposes via a communications structure such as the internet. The communications structure is substantially decentralised with regard to communication route switching therein for connecting the end users. That is, the end users can establish their own communication routes through the structure based on exchange of one or more authorisation certificates (user identity certificates—UIC) to acquire access to the structure. The structure includes an administration arrangement issuing the certificates to the end users. Such a communication system is described in WO 2005/009019.

Peer-to-peer systems and other communication systems that use the internet or any other packet switched network employ voice over IP (internet protocol) protocols (VoIP) to transmit data. These systems are commonly referred to as VoIP systems. VoIP systems are beneficial to the user as they are often of significantly lower cost than communication networks, such as fixed line or mobile networks, otherwise referred to as public switched telephone networks (PSTN). This may particularly be the case for long distance calls.

The connection of two terminals using more than one type of network is becoming increasingly common. For example communication may be routed via a private network and a public network such as the internet. This may occur when each terminal is located in different networks, or in an attempt to reduce the charges for routing the communication.

A private network, such as a private local area network (LAN) may be connected to the internet. In order for a device located in the private network to communicate with a node located in the internet, a gateway is used to provide the private network with a public address that is identifiable in the internet. Typically this gateway will be a network address translation (NAT) device or a proxy node.

In some cases networks may be connected by gateways that restrict the communication between the networks such that the gateway will only allow a connection between the networks to be established in one direction. Such gateways will hereinafter be referred to as restrictive gateways.

Restrictive gateways may allow devices in a private network to control when they receive data from another network. If a node in a public network is connected to a device in a private network via a restrictive gateway which prevents a communication being initiated by the node to the device, it will be necessary for the node to wait until the device in the private network establishes a communication with the node before the node can transmit data to the device. For example, if a node in the public internet requires information from a device located in a private network, then the node has to wait until the device establishes a connection with the node.

Restricting the direction in which a communication may be established is not limited to cases where the communication is established across two networks.

For example an operator of a network may choose to limit the direction in which a connection is established from a network node. For example, outgoing communications from the node may be prevented in order to avoid incurring the cost of the connection. In this case a connection may only be established with another party if the connection is established by the other party.

Restricting the direction in which a connection may be established from a node can present a number of problems, particularly in the case where the node is intended to route data to other devices. For example, data may need to be queued in a node of the transmitting network thereby stretching the resources of the transmitting node. This can be extremely problematic if the node is not able to determine when the receiving node will initiate a communication as the transmitting node will be unable to manage its resources efficiently.

A further problem presented by a restrictive gateway is that the transmission of data from the transmitting node may be required by the receiving node before the receiving node initiates the communication. For example the transmission of data from the transmitting node may be timed out before the receiving node initiates communication with the transmitting node.

One method for controlling the amount of data which is transmitted across a restrictive gateway is to require the devices in the private network to periodically establish contact or 'poll' the node located in the public network. However this solution places a burden on the resources of the devices required to poll the node.

SUMMARY

It is therefore an aim of embodiments of the invention to provide a method and system for controlling when data is retrieved from a node when the ability to transmit data from the node is restricted.

According to a first aspect of the present invention there is provided a method of transmitting messages from a network node in a communication network to a first user device wherein the network node transmits to a second user device a message-waiting notification, identifying the first user device and optionally identifying a node holding the message, and in response to that notification, the second user device transmits a connection request to the first user device, said connection request being acted on by said first user device to establish a connection, optionally with the identified node, whereby said message can be transmitted to said first user device.

According to a second aspect of the present invention there is provided a user terminal for communicating with a plurality of peer user terminals and a network node, said user terminal having means responsive to a message-waiting notification from said network node identifying at least one of said peer user terminals to transmit a connection request to said at least one identified peer user terminal for connection to the or another network node.

According to a third aspect of the present invention there is provided a network node in a communication network comprising means for generating packets for communicating with a plurality of user terminals using a communications protocol wherein one of said packets comprises: a header identifying one of said user terminals to receive said packet; and an identifier of another of said user terminals to indicate said other user terminal has a message waiting at the network node.

BRIEF DESCRIPTION OF THE DRAWINGS

For a better understanding of the present invention and as to how the same may be carried into effect, embodiments of the present invention will now be described by way of example only with reference to the following drawings:

FIG. 1 is a schematic representation of a communication network in accordance with an embodiment of the invention;

FIG. 2 is a diagram showing the protocol stack of a client program in accordance with an embodiment of the present invention;

FIG. 3 is a schematic representation of part of the communication network shown in FIG. 1;

FIG. 4 is a schematic representation the signalling between parts of the communication network shown in FIG. 1;

DETAILED DESCRIPTION

Figure 5:
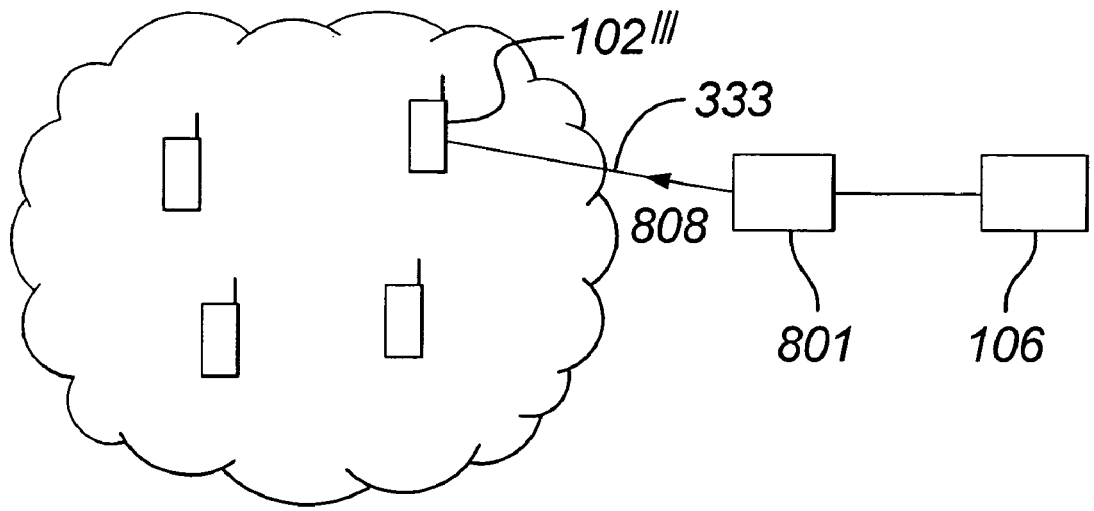
FIG. 5 is a schematic representation of the transmission of a notification message in accordance with an embodiment of the present invention.

Reference will first be made to FIG. 1, in which is shown a communication network 100, including a public network 104 and a private network 800. In one embodiment the public network 104 may be provided by the internet.

A user device 102 located in the private network 800 is shown to be connected to the internet 104 via a session node 106. The session node 106 and the user device 102 are separated by a restrictive gateway 801. The restrictive gateway provides the private network with a public IP address such that the private network is identifiable in the public network. The restrictive gateway 801 only allows a connection between the user device and the session node to be established by the user device. Accordingly the session node 106 may only send data to the user device 102 when there is an existing connection defining a physical data link 111 between the session node 106 and the user device 102.

The data connection 111 is used to transmit data from the user device 102 to the session node 106 via the gateway 801. In a preferred embodiment of the invention the data connection is an internet protocol connection such as Transmission Control Protocol (TCP) connection.

The user device 102 may be, for example, a personal computer, a gaming device, a personal digital assistant, a suitably enabled mobile phone, or other device able to connect to the network 104.

The session node 106 may be grouped with other session nodes (not shown) in a cluster. A cluster consists of multiple stand alone session nodes providing a set of predefined services. A directory (not shown) may be provided for connecting the user device to an appropriate session node within the cluster. The method of allocating a session node in a cluster to perform a task is known in the art and will not be described in any more detail.

In accordance with an embodiment of the invention the session node 106 runs a communication instance 122 defining a session dedicated to a user of the user device 102. The communication instance 122 enables the user of the user device 102 to communicate across the communication network 100 to establish a connection with another device enabled to communicate via the internet 104. In a preferred embodiment of the invention the communication instance 122 enables the user of the user device to communicate via a communication system operating on the Internet 104, such as a peer to peer system.

The session node 106 is able to run a plurality of communication instances for a number of concurrent user devices 102-102'''. The user device 102 runs a client software program 124 that provides a client interface on the device and allows the user of the user device 102 to communicate with the communication instance 122 running on the session node 106.

The client program 124 running on the user device has a number of different components or layers for implementing various functions, including a protocol layer 402 (FIG. 2) for managing the interface with the session node 106.

FIG. 2 shows a protocol stack for the client program 124 according to an embodiment of the present invention. The protocol stack shows an operating system layer 401, a protocol layer 402, a client engine layer 404 and a client user interface layer 406. Each layer is responsible for specific functions. Because each layer usually communicates with two other layers, they are regarded as being arranged in a stack as shown in FIG. 2.

The operating system layer 401 manages the hardware resources of the user device 102 and handles data being transmitted to and from the session node 106. The client protocol layer 402 of the client software communicates with the operating system 401. Processes requiring higher level processing are passed to the client engine layer 404. The client engine 404 also communicates with the client user interface layer 406. The client engine may be arranged to control the client user interface layer 406 to present information to the user via user interface means of the user device and to receive information from the user via the user interface means of the user device. The user interface means may comprise a speaker, a microphone, a display screen and a keyboard. This list is not exhaustive.

The communication instance 122 running on the session node 106 manages the communication between the client program 124 running on the device 102 and the internet 104. FIG. 3 shows the connection path between the communication instance 122 on the session node 106 and the client program 124 running on the user device 102.

The client program 124 may communicate with the session node 106 via a packet switched data connection 111. Each packet exchanged between the session node 106 and the client program 124 contains one or more attributes.

In accordance with an embodiment of the invention the client program 124 running on the user device 102 is arranged to set up a session with the session node 106. FIG. 4 shows the method steps in accordance with an embodiment of the invention for setting up a session with a session node 106. Data transmitted between the session node 106 and the client program 124 is transmitted via the restrictive gateway 801 on a packet switched connection 111.

In step S1 the client program 124 transmits a data packet 201 to the session node 106 via the gateway 801 to request a session.

In one embodiment of the invention the data packet 201 is sent unencrypted. Accordingly the data packet 201 sent in step S1 should not contain sensitive information. The data packet 201 may however include information that may be used for encryption methods to establish a secure connection between the user device 102 and the session node 106.

In step S2, in response to receiving the session request in data packet 201 the core module 205 of the session node 106 transmits a data packet 202 to the client program via the gateway 801 acknowledging the session request. The data packet 202 may contain information that may be used for encryption methods to establish a secure connection between the user device 102 and the session node 106. In a preferred embodiment of the invention the data packet 202 includes an identifier indicating the identity of the session node. The client program on the user device 102 may verify the identity of the session node using an authentication method.

In step S3 a secure connection between the session node 106 and the client program 124 is established using an encryption method.

At step S4 the session node 106 sends a data packet 203 to the user device 102 via the gateway 801 to confirm that it will handle the session. The data packet 203 may include the attributes listed in table 1:

TABLE 1

| KEY | TYPE | ATTRIBUTE |
| --- | --- | --- |
| CHUNKTYPE | integer | CONNECTED |
| CLIENT_PUBLIC_IP_ADDRESS | address | clients IP address as seen by session node |
| LATEST_VERSION | string | Newest version number |
| UPGRADE_URL | string | URL where upgrades can be downloaded |

As shown in table 1 the data packet 203 contains a 'CONNECTED' attribute to indicate that the session node will handle a session to connect the client program 124 and the network 104. The data packet further contains an attribute indicating the latest version number of the client program that is available to run on the user device. The data packet 203 may also indicate the URL (Uniform Resource Locator) of a session node from where the latest version of the client program may be downloaded.

As shown in table 1 the data packet 203 may contain an attribute defining the public IP address of the user device 102 as determined by the session node 106. The public IP address of the user device 102 may be transmitted in the data packet 203 to user device 102 so that it can be verified.

In step S5, in response to receiving the data packet 203 indicating that session node 106 will allocate a communication instance 122 defining a session to connect the client program 124 and the network 104, the client program 124 sends the session node 106 data relating to the user device 102 in data packet 204. The data packet 204 may include the attributes listed in table 2:

TABLE 2

| KEY | TYPE | ATTRIBUTE |
| --- | --- | --- |
| CHUNKTYPE | integer | CLIENTDATA |
| CLIENT_IP_ADDRESS | address | Device private IP address |

As shown in table 2, the data packet 204 includes an attribute defining a private IP address of the user device. The IP address of the device identifies the user device 102 in the private network 800.

In response to receiving the data packet 204, or in response to receiving a subsequent login request from the client program 124, a communication instance defining a session is allocated to the client program 124.

As shown in FIG. 3, the session node 106 further comprises a core module 205 for allocating the communication instance 122 to the client program 124.

According to one embodiment of the invention the protocol layer 402 of the client 124 will use a different protocol to the protocol used within the communication instance 122. According to this embodiment of the invention a dedicated protocol adaptor instance 208 is arranged to run on the session node 106 for the client 124 to facilitate communication between the client program and the communication instance 122. The dedicated protocol adaptor instance may be assigned together with the communication instance to the client program 124 when the client program logs into the communication system at the session node 106.

In an alternative embodiment of the invention the client program and communication instance operate using the same protocol and accordingly and protocol adaptor is not required.

Once the communication instance 122 has been allocated to the client program 124 a session identifier is transmitted from the session node 106 to the client program. The session identifier is used to locate the session each time the client program reconnects to the session node. As such the session is independent of the connection between the session node 106 and the client program 124 and may persist even if the connection is terminated.

In one embodiment of the invention the connection between the client 124 and the session node 106 is a non persistent connection. For example, the connection between the client 124 and the session node 106 may be terminated after each packet is sent from the session node 106. Alternatively the client 124 may be arranged to terminate the connection with the session node 106 after a predetermined time has lapsed since a data packet was exchanged with the session node 106.

In a further embodiment of the invention the session node 106 is arranged to terminate the connection with the client program 124 after a predetermined time has lapsed since the data packet was exchanged with the session node 106. In this embodiment the session node will send a data packet containing an attribute indicating that the session node is disconnecting before closing the connection. The client program may be arranged to close the TCP connection after a predetermined time of receiving this data packet. According to one embodiment of the invention the client program 124 is arranged to close the TCP connection 3 seconds after receiving the disconnect data packet from the session node.

As shown in FIG. 1 the private network 800 comprises a plurality of user devices 102-102'''. The user devices 102-102''' may each be user devices that are capable of establishing a connection with each other by means of the private network 800. The nodes 102-102''' are also capable of establishing a connection with the session node 106. Each user device 102-102''' capable of establishing a connection with the session node has a client program 124 installed for connecting to the network 104 via the session node 106.

Due to the presence of the restrictive gateway 801 between the session node 106 and the private network 800 the session node 106 is only able to send data to a client program 124 running on a user device when there is an existing connection between the session node and the user device. According to an embodiment of the invention if there is no existing connection between the session node 106 and the client program running on the user device 102, the session node 106 may transmit data to the user device 102 by using an existing connection with another user device in the private network 800. The other user device may then be used to relay the data to the user device 102 via the private network, as described hereinafter.

The session node 106 is arranged to identify sessions for devices that have a common public IP address as defined by the IP address of the gateway 801. Devices having a common public IP address are determined as being located within the same private network 800.

FIG. 5 shows the private network 800 connected to the session node 106 via the gateway 801. In FIG. 5, user device 102''' has an existing data connection with the session node 106 via the gateway 801. In accordance with an embodiment of the invention the user device 102''' may be used to relay data from the session node 106 to another device located in the private network 800 that has a session with the session node. The user device 102''' will hereinafter be referred to as a relay device 102'''. The data connection may be a TCP connection and is shown in FIG. 5 as data connection 333.

If the session node becomes aware of information from the network 104 that should be sent to the user device 102, hereinafter referred to as the destination device 102, the session node may send a notification 808 to the relay device 102''' over data connection 333 to instruct the relay device 102''' to notify the destination device 102 to contact the session node 106. In a preferred embodiment of the invention the relay device 102''' will notify the destination device 102 by forwarding the notification 808 to the destination device 102.

In accordance with an embodiment of the invention the notification 808 will include the private address, or other suitable identifier of the destination device 102. The notification 808 will also include information indicating that the packet is a notification. The notification 808 may also include an identifier of the session node, such as an IP address of the session node that the destination device 102 is required to establish a connection with. The notification 808 may further include additional information that is to be presented to the destination device. The additional information may describe the reason that the session node is sending the notification. For example the session node 106 may be notifying the destination device 102 about a message received by the communication instance 122 from the network 104.

On receipt of the notification 808, the relay device 102''' may forward the notification 808 directly to the destination device 102 defined in the notification. Alternatively the relay device 102''' may route the notification 808 to the device 102 via other user devices in the private network 800. Alternatively the relay device 102''' may broadcast the notification within the network 800. The method of transmitting the notification 808 to the device 102 will depend on the protocol used within the private network 800.

In a further embodiment of the invention, if the session node 106 needs to contact more than one user device, the notification 808 may include a list of devices that are to contact the session node 106. According to this embodiment the relay device 102''' will forward the notification to each device listed in the notification.

Figure 6:
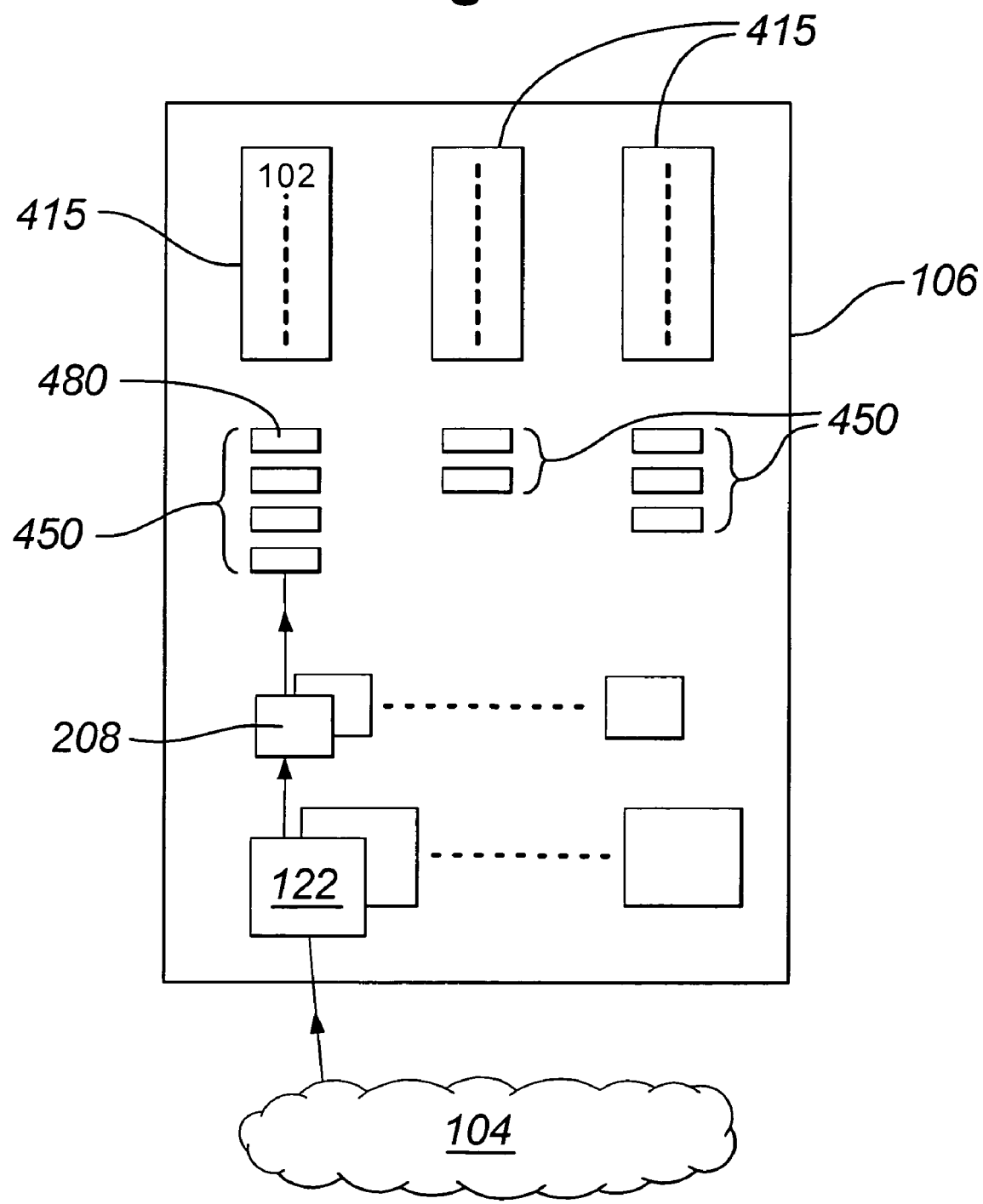
FIG. 6 is a schematic representation of a session node in accordance with an embodiment of the present invention.

In one embodiment of the invention the session node 106 may be connected to user devices from a plurality of private networks. Reference will now be made to FIG. 6. FIG. 6 shows a plurality of lists 415 stored on the session node 106. Each list corresponds to a different private network. Each list 415 defines the user devices that have a session with the session node 106 and are part of the same private network. FIG. 6 also shows a plurality of message queues 450 stored on the session node 106. The messages 480 that are queued in the queues 450 are messages that need to be sent to each device in a private network that has a session with the session node 106. The messages are arranged in each queue such that each queue 450 contains messages for devices located in the same network. Accordingly each message queue may be linked to a corresponding list of devices 415. As shown in FIG. 6, the messages 480 may be received from the network 104 via a communication instance 122 dedicated to a user for which the message was intended.

The session node 106 may be arranged to determine if it has an existing connection with a device included in a list 415. If the session node has a connection with a device listed in the list 415 the session node is arranged to check if there are any messages waiting in the message queue 450 that correspond to the same private network as the list 415. If there are messages queued in the queue 450 the session node 106 is arranged to generate a notification for at least one of the devices for which there is a message in message queue 450.

According to one embodiment of the invention the number of devices that may be listed in a notification 808 is limited to a predetermined amount. If there are number of devices with messages waiting in the message queue exceeds the limit of the number of devices the session node can notify using one message the session node may send an additional notification message for notifying the remaining devices to the next device that establishes a connection with the session node.

In one embodiment of the invention it may be necessary for the client program 124 running on a user device to establish a connection with the session node 106 at predetermined time intervals. This ensures that at least one device will contact the session node 106 within a predetermined time period. This predetermined period will hereinafter be referred to as the polling interval.

The session node 106 is arranged to control the polling interval. The polling interval may be updated by providing an updated polling interval to devices that establish a connection with the session node 106. In this case the session node 106 may quickly update the polling interval in dependence on the dynamics of the private network 800.

For example, the maximum number of devices that can be notified using one notification message 808 may be 5. The 5 notified devices that then contact session node for the messages 480 will each receive further notification messages. The method is repeated until all the queued messages 480 have been delivered. The inventors of the present invention have found that with a reasonably popular service, where number of devices in private network is relatively large, the polling interval can be significantly lowered without impact on message delivery time. For example, with 10 nodes polling at random times, the outcome is that polls can be 10 times less frequent to maintain the same level of response time as one node polling the session node at regular intervals.

In one embodiment of the invention the user devices 102'-102''' belonging to the same private network may be have sessions running on different session nodes arranged in the same cluster. In this embodiment of the invention the session node 106 may transmit a connection request to a user device to request that the user device connects to another session node in the cluster. This embodiment will be described in relation to FIG. 7.

Figure 7:
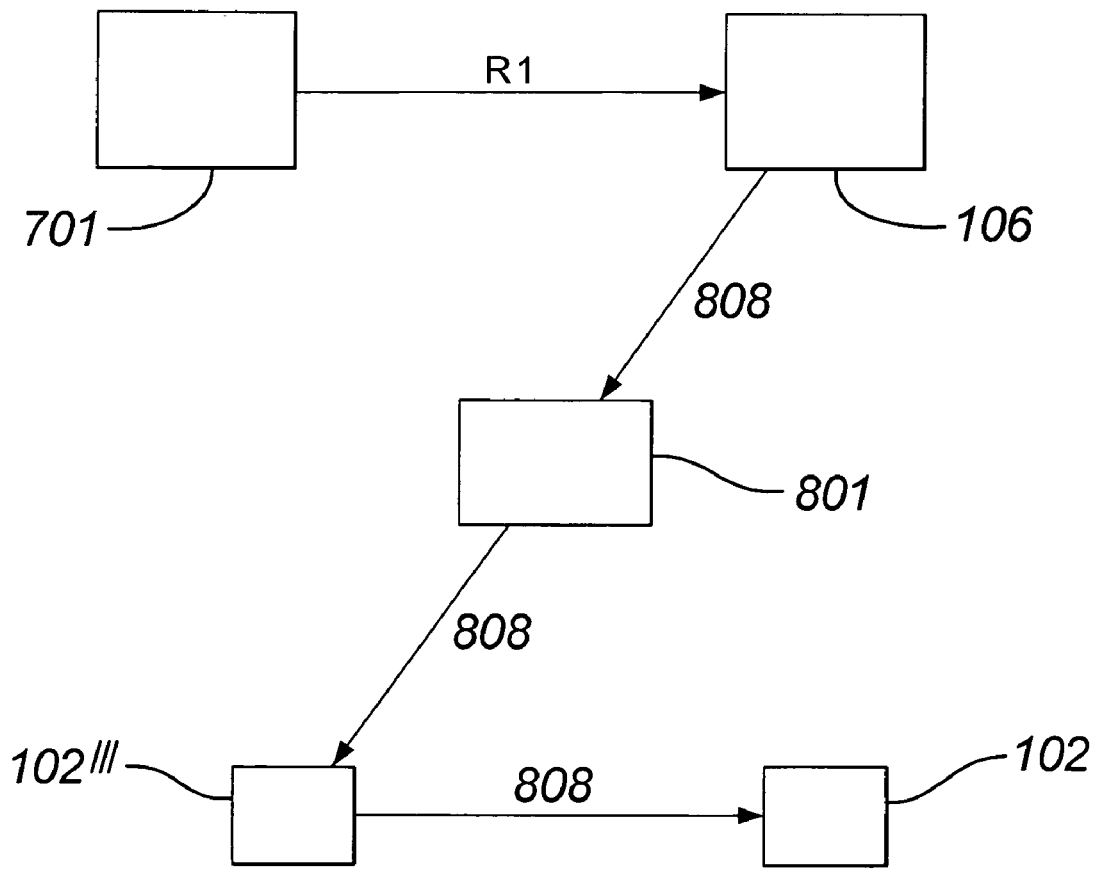
FIG. 7 is a schematic representation of signalling between parts of the communication network in accordance with a further embodiment of the invention.

FIG. 7 shows a session node 701 arranged to contact a user device 102 via another session node 106. In this embodiment of the invention the session node 701 that the device is requested to contact is referred to as the poll initiator session node. The session node 106 that is used to transmit the request to the device is referred to as the relay session node. In a preferred embodiment the poll initiator session node 701 is arranged to send a request R1 to the relay session node 106 to request that a device 102 located in a private network is contacted. In response to the request the relay session node 106 is arranged to transmit a notification 808 to the device 102 for the device 102 to contact the poll initiator session node 701. If the relay session node 106 has an existing connection with the device 102 the notification 808 is sent directly from the session node 106 to the device 102 via the restrictive gateway 801. If however the session node does not have an existing connection with the user device 102 the relay session node will determine if there is an existing connection with any other device in the same private network as the user device. As shown in FIG. 7, if it is determined that the relay session node 106 has an exiting connection with another device 102'' located in the same private network as the device 102 the relay session node is arranged to transmit the notification 808 to the device 102 via the device 102'''.

The notification 808 may contain the attributes listed below in table 3. For example, in one embodiment of the invention the notification 808 may include an attribute defining the IP address of the poll initiator session node. The notification may further include an attribute defining a list of user devices that are required to contact the session node.

In a preferred embodiment of the invention the notification 808 is included in a data packet that includes data that is intended for the relaying device 102'''. For example the attributes defined in table 3 may be appended to any data packet that is intended for the relay device 102'''.

TABLE 3

| KEY | type | Value |
| --- | --- | --- |
| POLL_INITIATOR | address | IP address from where the initiative for connection came (for 'push') |
| NOTIFY_NODES | binary | list of addresses to notify about polling |
| POLL_TOKEN | binary | token for presenting to poll initiator |

In one embodiment of the invention the session node is arranged to verify that two devices having the same network address are part of the same network. The session node 106 can verify that the relay device 102''' and the destination device 102 are part of the same network by including a poll token as shown in table 3 in the notification 808. In this embodiment of the invention the destination device 102 is arranged to respond to a notification 808 by presenting the poll token when it establishes a connection with the session node 106. If the poll token presented by the destination device 102 matches the poll token transmitted in the notification to the relay device the session node can verify that the relay device 102''' and the destination device 102 are in the same private network and are able to connect to each other.

In a further embodiment of the invention the session node 106 may be arranged to determine if the notification was successfully transmitted to the user device 102 via the relay device 102'''. If the device 102 does not establish a connection with the session node 106 within a predetermined time limit of the session node transmitting a notification the session node may determine that the notification was not successfully transmitted. In this case the session node 106 may be arranged to transmit the notification via an alternative relay device 102. Alternatively the session node 106 may determine that the devices in the private network are unable to establish a connection with each other.

In an alternative embodiment of the invention the notification message transmitted to the notified device may not require the device to establish a connection with the session node 106. Instead the notification message may be used to transmit data to the device 102 via the relay device 102'''.

In one embodiment of the invention the private network is a mobile ad hoc network.

In one embodiment of the invention the gateway 801 is a NAT (Network Address Translation) Firewall.

In an alternative embodiment of the invention the session node 106 may be located in the same network as the user devices. In this case the session node is restricted from initiating a connection with user devices located in the same network as the session node.

While this invention has been particularly shown and described with reference to preferred embodiments, it will be understood to those skilled in the art that various changes in form and detail may be made without departing from the scope of the invention as defined by the claims.

What is claimed is:

1. A method of transmitting a message from a network node in a communication network to a first user device, wherein the first user device and a second user device are separated from the communication network by a restrictive entity that allows a connection between the first user device and the communication network to be established only by the first user device in one direction from the first user device to the communication network and preventing a communication being initiated by a node in the communication network to the first and second user devices, the method comprising:
    the second user device having established an existing connection to said node via the restrictive entity;
    the node in the communication network transmitting to the second user device on the existing connection via the restrictive entity a message-waiting notification, identifying the first user device and indicating that the first user device has a message waiting at the network node in the communication network;
    in response to that notification, the second user device transmitting a connection request to the first user device over a connection between the first and second user device,
    said connection request being acted on by said first user device to establish a second connection from the first user device to the communication network via the restrictive entity, whereby said message can be transmitted to said first user device from said network node via said second connection.

2. A method as claimed in claim 1 wherein the network node is arranged to transmit messages to a plurality of user devices including at least said first user device and said second user device.

3. A method as claimed in claim 2 wherein each of said plurality of user devices are arranged to establish a connection with the network node at predetermined intervals.

4. A method as claimed in claim 2 wherein at least some of said plurality of devices are located within a first network.

5. A method as claimed in claim 3 wherein the predetermined interval that the said at least some of the plurality of devices are required to establish a connection with the network node is dependent on the number of said plurality of user devices located within the first network.

6. A method as claimed in claim 4 wherein the network node is located within a second network.

7. A method as claimed in claimed in claim 4 further comprising the step of determining that the first user device and the second network device are located in the first network.

8. A method as claimed in claim 7 wherein the second user device transmits a connection request to the first user device via a connection established within the first network.

9. A method as claimed in claim 6 wherein the first network and the second network are connected via a restrictive gateway.

10. A method as claimed in claim 6 wherein the message is received at the network node from the second network.

11. A method as claimed in claim 1 wherein the message-waiting notification comprises an identity of a node holding the message, and wherein the node in the communication network is the identified node.

12. A method as claimed in claim 6 wherein the second network is a public network.

13. A method as claimed in claims 6 wherein the second network is a communication system operating on the Internet.

14. A method as claimed in claim 4 wherein the first network is a private network.

15. A user terminal for communicating with a plurality of peer user terminals and with a node in a communication network, wherein the user terminal and the plurality of peer user terminals are separated from the communication network by a restrictive entity that allows a connection between the user terminal and the communication network to be established only by the user terminal, in one direction from the user terminal to the communication network and preventing a communication being initiated by the node to the user terminal and the plurality of peer user terminals, the user terminal comprising:
- a receiver that receives on an existing connection via the restrictive entity a message-waiting notification from said node, which notification identifies at least one of said peer user terminals and indicates that said at least one of said peer user terminals has a message waiting at the node or another node in the communication network; and
- a sender that sends, over a connection between the user terminal and to said at least one identified peer user terminal, a connection request to said at least one identified peer user terminal in response to the receiver receiving said message-waiting notification, which connection request notifies the at least one identified peer user terminal to establish a second connection from the identified peer user terminal to the communication network, via the restrictive entity, to the node or another node in the communication network.

16. A method of operating a user terminal, wherein the user terminal is for communicating with a plurality of peer user terminals and with a node in a communication network, and wherein the user terminal and the plurality of peer user terminals are separated from the communication network by a restrictive entity that allows a connection between the user terminal and the communication network to be established only by the user terminal in one direction from the user terminal to the communication network and preventing a communication being initiated by a node in the communication network to the user terminal and the plurality of peer user terminals,
the method comprising:
- the user terminals having established an existing connection to said node via the restrictive entity;
- receiving at the user terminal, from said node on the existing connection via the restrictive entity, a message-waiting notification that identifies the at least one of said peer user terminal and indicates that said at least one identified peer user terminal has a message waiting at the node or another node in the communication network,
- in response to receiving said message-waiting notification, transmitting a connection request from the user terminal to said at least one peer user terminal over a connection between the user terminal and the at least one peer user terminal, the connection request notifying the at least one identified peer user terminal to establish a second connection from the identified peer user terminal to the communication network via the restrictive entity, to the node or another node in the communication network.

* * * * *